United States Patent [19]

Brown

[11] Patent Number: 4,816,803

[45] Date of Patent: Mar. 28, 1989

[54] TAMPER ALARM FOR SEMI TRAILER

[76] Inventor: Kenneth W. Brown, 117 Woosley Dr., Nampa, Id. 83651

[21] Appl. No.: 161,153

[22] Filed: Feb. 26, 1988

[51] Int. Cl.⁴ .............................................. B60R 25/00
[52] U.S. Cl. ................................... 340/426; 340/545; 340/431; 307/10.2
[58] Field of Search ..................... 340/63, 64, 65, 545, 340/546, 547; 307/10 AT

[56] References Cited

U.S. PATENT DOCUMENTS

| 3,848,243 | 12/1974 | Schirmer | 340/545 X |
| 3,924,256 | 12/1975 | Cohen | 340/545 X |
| 4,205,300 | 5/1980 | Ho et al. | 340/65 |
| 4,278,963 | 7/1981 | Allen | 340/63 X |

Primary Examiner—Joseph A. Orsino
Assistant Examiner—Jeffery A. Hofsass
Attorney, Agent, or Firm—Frank J. Dykas

[57] ABSTRACT

An alarm circuit for detecting the opening of any door of a semi trailer. The alarm circuit has power supply 11, negatively grounded with the positive terminal electrically connected to a keyed rotary switch 16. A double pole double throw relay 14 is electrically connected at terminal five to the output terminal of the keyed rotary switch is electrically connected at its terminal five to the output terminal of the keyed rotary swtich 16. A green indicator lamp 19, which is grounded is electrically connected to a normally open single pole single throw momentary push button switch 17 and to terminals three and seven of the relay 14. The other end of the normally open single pole single throw momentary push button switch 17 is electrically connected to the output terminal of the keyed rotary switch 16. An alarm horn 13, which is grounded, is electrically connected to terminal number one of relay 14. The detecting switches, a plurality of magnetic reed switches 12 are serially connected to each other and to ground and to terminals six and eight of relay 14. A red indicator lamp 18 is connected to the input terminal of the rotary keyed switch 16 and to terminal two of relay 14.

1 Claim, 3 Drawing Sheets

TAMPER ALARM FOR SEMI TRAILER

BACKGROUND OF THE INVENTION

1. Technical Field

This invention relates to an electrical alarm circuit. In particular, an alarm circuit for detecting the opening of either of two doors on a semi trailer.

2. Background Art

The independent trucker has an additional burden placed on him by his customers which is the security of the customer's goods. Because of the nature of the trucking business, it is impractical for the independent driver to provide around-the-clock security for his cargo during stopovers, rest periods, lunch breaks, and the like. It is therefore necessary to provide some deterrent method which can be controlled by the truck driver. What is needed is a simple, low cost, tamper alarm which is designed specifically for use in a semi trailer and is easy to operate and install.

The art is filled with burgular alarms tailored to fulfil a specific need. FITCHETT, U.S. Pat. No. 4,118,692, teaches an alarm device incorporated into the closure hardware of a standard lockable attache type handbag. If the bag is opened by other than authorized means, the alarm sounds.

A hinge mounted micro switch as taught in PETERSON, U.S. Pat. No. 3,715,537, electrically connected to an alarm circuit might satisfy the need, however retrofitting a semi trailer with the hinge mounted micro switch would be both costly and sometimes complicated.

Accordingly, it is an object of this invention to provide an alarm circuit for detecting the opening of either of two semi trailer doors which is both cost effective and easy to install.

A second object of this invention is to provide an alarm means which is simple to operate yet effective in deterring a possible cargo theft.

DISCLOSURE OF INVENTION

These objects are accomplished by locating a magnetic reed switch at each of the two semi trailer doors which are connected in series to one another and to a double pull double throw relay. A control panel is provided which houses a keyed rotary switch, a red indicator light, a green indicator light and a single pull single throw momentary push button switch. The keyed rotary switch is supplied by a direct current through a fuse which provides over current protection. An alarm horn is also provided to generate a loud audible signal in the case of an attempted cargo theft.

The magnetic reed switches are installed on the inside of the semi trailer. They are connected by electrical wire which also runs on the inside of the trailer along the upper edge of the trailer wall and down to the back of the control panel. The front of the control panel is located on an outside wall of the semi trailer, preferably toward the front end of the trailer and easily accessible by the driver. The alarm horn is preferably located on the roof of the semi trailer in a location not easily accessible by a would be thief. The direct current power supply is provided either by an independent trailer supply or the standard semi trailer electrical system.

To activate the alarm the driver inserts his key in the rotary switch and turns it on. The alarm horn then sounds and the green indicator light should light up. An illuminated red indicator light indicates that both magnetic reed switches are closed and the system is ready for arming. If the light is not illuminated at least one of the semi trailer doors is open. After activating the keyed rotary switch the driver then momentarily presses the start button. This activates the relay switches and turns off the alarm horn. This also provides a completed circuit through the two magnetic reed switches and should turn the red indicator light off. The system is now armed and ready.

BEST MODE FOR CARRYING OUT INVENTION

Figure 1:
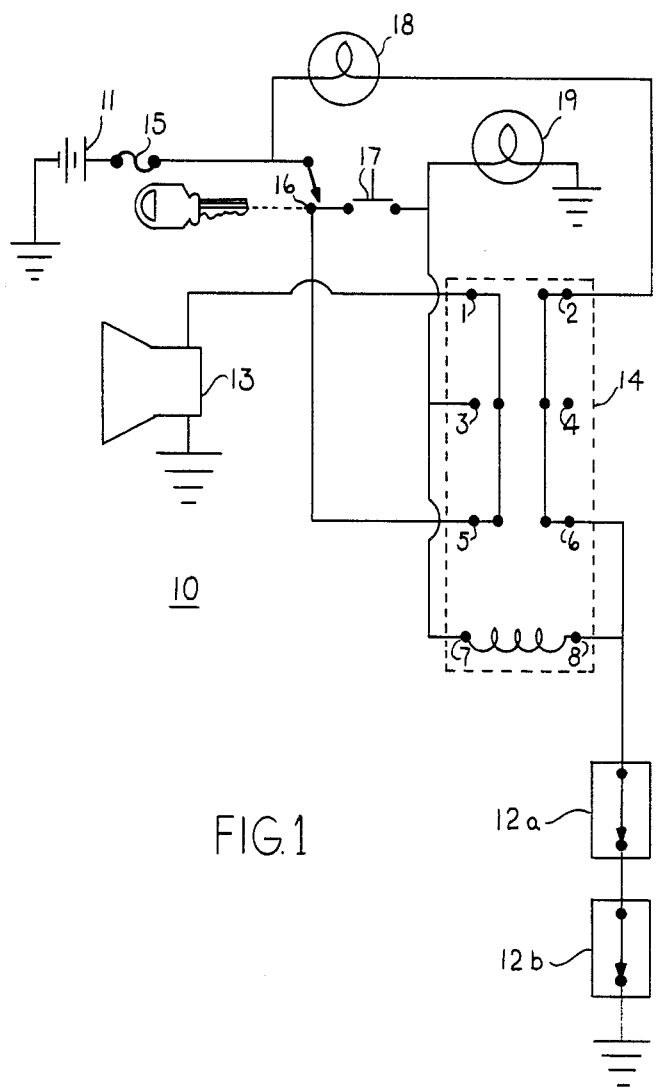
FIG. 1 is a schematic diagram of the electrical alarm circuit.

Referring to FIG. 1, an alarm circuit 10 is shown and has major components which are a battery 11, a pair of magnetic reed switches 12a and 12b, an alarm horn 13, and a double pole double throw relay 14. Hereinafter the double pole double throw relay 14 will simply be referred to as the relay 14. The alarm circuit 10 has additional components which are a fuse 15, a keyed rotary switch 16, a single pole single throw momentary push button switch 17, a red indicator lamp 18, and a green indicator lamp 19.

The electrical components numbers 11 through 19, are electrically connected in the following manner. The power supply 11 which is anticipated to be a standard 12 volt battery, is electrically connected at its positive terminal to one end of fuse 15. The input terminal of the keyed rotary switch 16 is electrically connected to the other end of fuse 15. The output terminal of the keyed rotary switch 16 is electrically connected to terminal number five of relay 14. Also electrically connected to the output terminal of the keyed rotary switch 16 is one terminal of single pole single throw momentary push button switch 17. The other terminal of the single pole single throw momentary push button switch 17 is connected to terminal three of the relay 14. A green indicator lamp 19 has one of its terminals connected with the end of the single pole single throw momentary push button switch 17 and to terminals three and seven of the relay 14. The unconnected terminal of the green indicator lamp 19 is now electrically connected to ground. A red indicator lamp 18 has one of its terminals connected to the input terminal of the keyed rotary switch 16 and its other terminal connected to terminal number two of the relay 14. An alarm horn 13 is connected to relay terminal number one. The pair of magnetic reed switches 12a and 12b are electrically connected in series one to the other. The unconnected terminal of one of the magnetic reed switches 12b is connected to ground. The other unconnected terminal of the magnetic reed switch 12a is connected to terminals six and eight of the relay 14.

Figure 2:
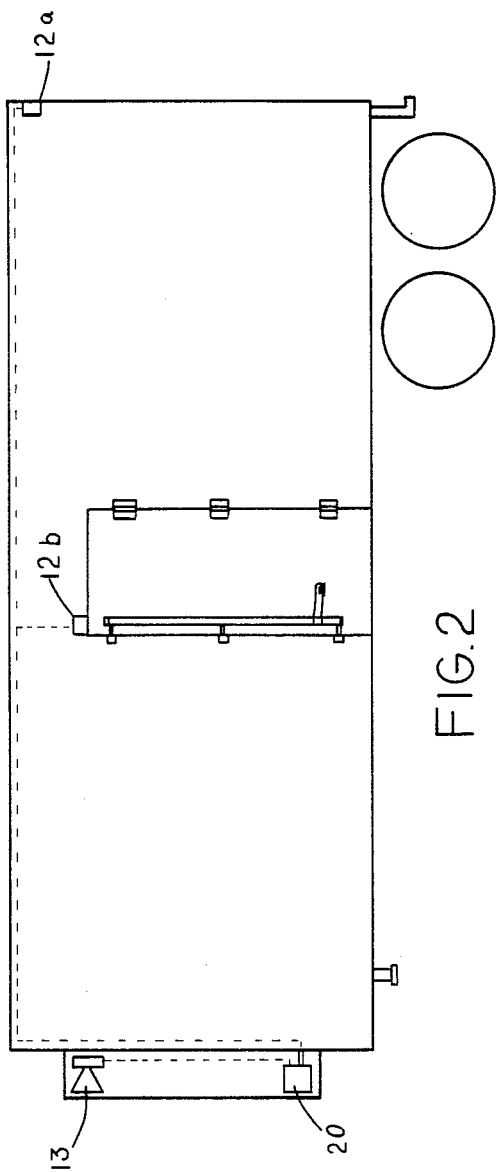
FIG. 2 is a side view of a semi trailer showing the alarm circuit components and their preferred locations.
Figure 3:
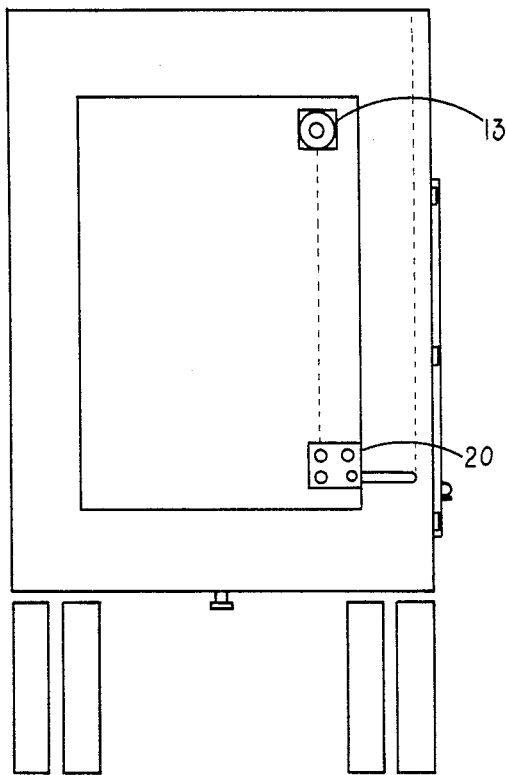
FIG. 3 is a front view of a semi trailer.

Referring now to FIGS. 2 and 3, the keyed rotary switch 16, red indicator lamp 18, green indicator lamp 19, and the single pole single throw momentary push button switch 17 are housed in a control panel 20 which is preferably mounted at a location on the front of the semi trailer which is easily accessible by the operator. The alarm horn 13 is also mounted on the front end of the semi trailer but at a location which is not easily accessible by a would be thief. The magnetic reed switches 12a and 12b are each mounted on one of the two doors of the semi trailer. The semi trailer pictured in FIG. 2 has one magnetic reed switch 12a mounted on the back door and the other magnetic reed switch 12b mounted on the side door.

To actuate the alarm the operator inserts his key into the keyed rotary switch 16 and turns. Because there is no current flowing between terminals seven and eight of relay 14 the alarm horn 13 sounds by virtue of the switch connection between terminals five and one. The red indicator lamp 18 is also lit by virtue of the switch connection between terminals two and six of the relay providing that the magnetic reed switches 12a and 12b are closed. If the red indicator lamp 18 does not light this would indicate to the operator that the doors on the semi trailer were not closed. The operator, seeing that the red indicator lamp 18 is lighted, presses the single pole single throw momentary push button switch 17. This allows circuit to flow in the actuation coil 21 between terminals seven and eight of relay 14. The induced electromagnetic field causes the internal relay switches to throw connecting terminals three and five and also terminals four and six. the result is a deactuation of the alarm horn 13, the deactuation of red indicator lamp 18, and the illuminating of green indicator lamp 19. The illumination of green indicator lamp 19 signifies that the alarm system 10 is now armed and ready.

While there is shown and described the present preferred embodiment of the invention, it is to be distinctly understood that this invention is not limited thereto but may be variously embodied to practice within the scope of the following claims.

I claim;

1. An alarm circuit for detecting the opening of either of two doors on a semi trailer which comprises:
    means for supplying a direct current;
    a fuse electrically connected at one end to one terminal of the direct current power supply;
    a keyed rotary switch having its input terminal electrically connected to the other end of the fuse;
    a double pole, double throw relay having terminals one, two, three, four, five, six , and seven, and eight, wherein the relay is energized when electrical current passes between terminals seven and eight and wherein terminal pairs one and five, and two and six are electrically connected when the relay is not energized, and terminal pairs five and three, and pairs six and four are connected when the relay is energized, said relay electrically connected at terminal five to the output terminal of the keyed rotary switch;
    an incandescent lamp having one terminal electrically connected to ground;
    a normally open single pole single throw momentary push button switch having one terminal electrically connected to the output terminal on the keyed rotary switch and the other terminal electrically connected to the other terminal of the incandescent lamp and to terminals three and seven of the relay;
    an audible signal producing device having one terminal electrically connected to terminal one of the relay and its other terminal electrically connected to ground;
    a plurality of magnetic reed switches, serially connected to each other and to ground, wherein one magnetic reed switch is operably attached to each door of the semi trailer;
    an electrical connection attaching the unattached magnetic reed switch terminal in parallel with terminals six and eight of the relay;
    a second incandescent lamp having one terminal electrically connected to the input terminal of the keyed rotary switch and its other terminal electrically connected to terminal two of the relay.

* * * * *